L. T. BAKER.
TURPENTINE GATHERER.
APPLICATION FILED JUNE 23, 1910.
1,013,107.
Patented Jan. 2, 1912.
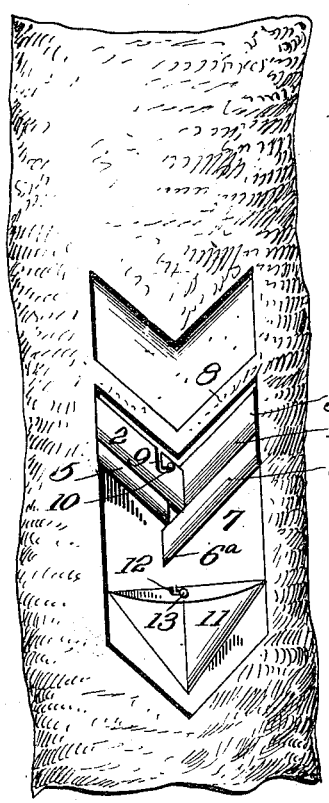
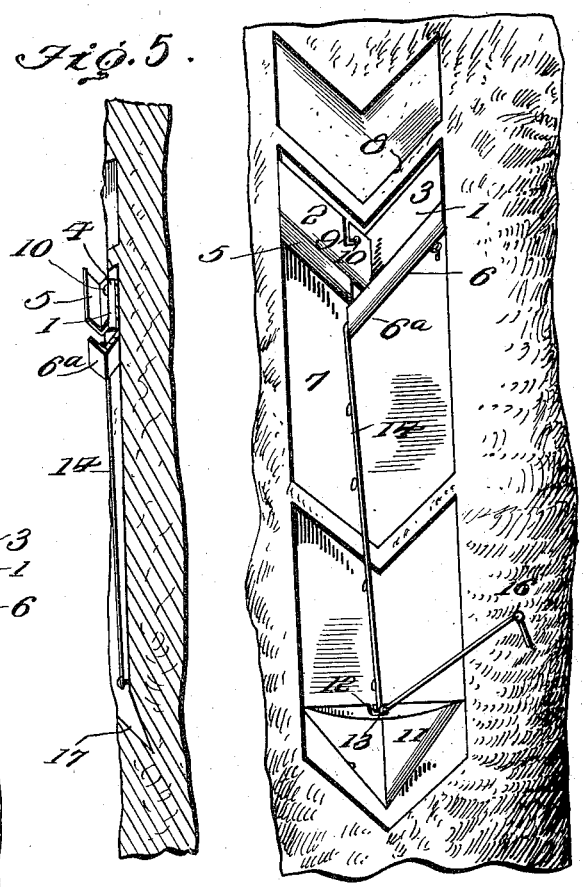
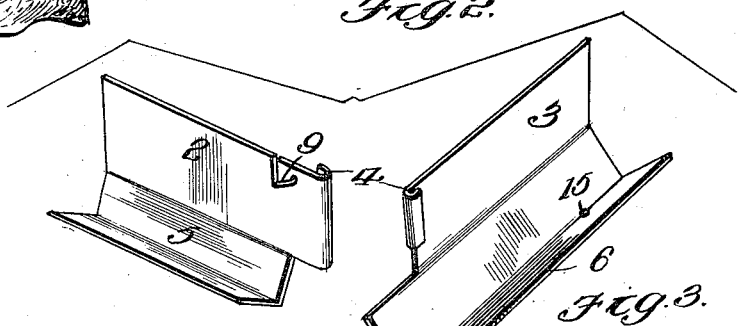
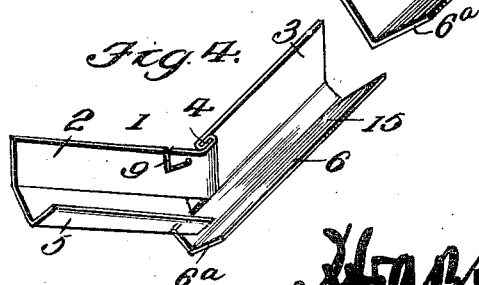
Witnesses
W. N. Woodson.
Juana M. Fallin.
Inventor
L. T. Baker.
H. A. R. Lacey, Attorneys.
COLUMBIA PLANOGRAPH CO., WASHINGTON, D. C.

UNITED STATES PATENT OFFICE.

LEWIS T. BAKER, OF PENSACOLA, FLORIDA.

TURPENTINE-GATHERER.

1,013,107. Specification of Letters Patent. Patented Jan. 2, 1912.

Application filed June 23, 1910. Serial No. 568,568.

*To all whom it may concern:*

Be it known that I, LEWIS T. BAKER, citizen of the United States, residing at Pensacola, in the county of Escambia and State of Florida, have invented certain new and useful Improvements in Turpentine-Gatherers, of which the following is a specification.

It is well known that in the ordinary process of gathering turpentine it is the practice to provide in the chipped face of the tree two or more deep gashes or incisions into which are driven the usual gutters that direct the sap exuding from the tree into a collecting receptacle. However, this arrangement has been found quite objectionable on account of the fact that the gutters obstruct the free passage of the sap in the trunk of the tree. Furthermore, it becomes necessary to provide additional gashes when the gutters are moved to a higher position each season, and the tree is thus materially weakened and is likely to be blown down.

The object of the present invention is an improved turpentine gatherer which is applied to the tree so as to in no wise interfere with the free flow of the sap, and which is secured to the tree without injury thereto and is adapted to be conveniently adjusted to higher positions as occasion demands.

A further object of the invention is a device of this character which provides means for conducting the drippings from the gutter into the collecting receptacle, in order to insure against waste and to prevent the sap from flowing along the exterior of the tree and becoming adulterated with foreign matter.

A still further object of the invention is a sap gatherer which is thoroughly practical and efficient, which possesses to a marked degree the characteristics of simplicity and durability, and which is capable of being easily and cheaply manufactured.

With these and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawing, in which:

Figure 1 is a side elevation showing the invention applied to a tree, the spout being positioned in close proximity to the cup; Fig. 2 is a similar view showing the gutters mounted at a considerable distance above the cup and the wire extending between the spout and the cup to lead the sap from the former to the latter; Fig. 3 is a perspective view showing the apron sections and the gutters in juxtaposition; Fig. 4 is a similar view with the parts associated; Fig. 5 is a vertical section showing the invention applied to a tree which is boxed in the usual manner.

Corresponding and like parts are referred to in the following description and indicated in all the views of the drawing by the same reference characters.

My improved turpentine gatherer is preferably constructed of suitable sheet metal and includes a substantially flat apron 1 which is designed to fit against the chipped face of the tree. The apron is elongated and is preferably divided intermediate of its ends to form separate co-acting sections 2 and 3. The sections are oppositely inclined so as to converge downwardly, and are formed at their meeting ends with integral vertically disposed flanges 4, which serve to hold the sections together. It is to be understood, however, that the sections may be riveted, soldered or seamed, as desired.

The apron sections 2 and 3 are provided along their lower edges with integral gutters that are designated 5 and 6 respectively.

The gutters outstand from the apron sections and are preferably V-shaped in cross section, although not necessarily so. The gutters converge downwardly on account of the angular disposition of the sections 2 and 3. The gutter 6 is extended longitudinally at its lower end beyond the meeting end of the section 3, and is disposed at a suitable distance below the adjacent end of the gutter 5 so as to receive the drippings therefrom. The extended portion of the gutter 6 thus serves as the spout 6ª for the turpentine gatherer. It is to be noted that the lower end of the gutter 5 terminates short of the meeting end of its apron section so as to be arranged at a sufficient distance above the spout to in no wise obstruct the same and to permit the sap to be discharged freely therefrom.

In the practical use of the invention the apron 1 is placed against the chipped face 7 of the tree with its upper edge fitting under a peak 8—i. e., a V-shaped strip of bark extending across the chipped face. The device is secured in position through the medium of a bayonet slot 9 that leads from the upper edge of the apron 1 in proximity to the joint between the co-acting sections, said bayonet slot being detachably engaged with a nail or other suitable fastening device 10 that is driven into the tree. The sap exuding from the tree, flows over the peak 8 and upon the apron, the strip of bark serving in its usual capacity to prevent the sap from passing behind the device. The sap runs into the gutters 5 and 6 and drips from the former into the latter. The sap is discharged from the spout 6ª and flows into a cup 11 which is provided at a suitable distance below the spout. The cup is formed with a bayonet slot 12 detachably engaged with a nail 13 secured in the tree. The cup may, of course, be of any approved construction or design, but is preferably formed from sheet metal for the sake of durability and cheapness.

It will be seen that the apron and gutters may be quickly detached and conveniently applied beneath the new chipped face which is provided each season. This change may be effected without the liability of injuring or materially weakening the tree. On account of the simple means of fastening the device in place, the invention is capable of being applied at greater heights than is possible with the ordinary gutters that are held in gashes in the tree trunk.

When the apron and gutters are mounted at a considerable distance above the cup, it is contemplated to employ a wire or like flexible conductor 14 which is secured at one end in an aperture 15 in the bottom of the gutter 6. The wire extends along the bottom of the gutter and passes substantially vertically downwardly from the spout 6ª to the cup 11. The wire is preferably passed beneath the nail 13 and is extended laterally with its free end wrapped around a nail 16 that is secured in the tree trunk at a convenient point. The sap discharged from the spout 6ª flows down the wire and is conducted directly into the cup 11, whereby to preclude possible waste. The wire prevents the sap from coming into contact with and flowing down the external surface of the tree, as is a manifest desideratum in order to prevent the sap from becoming adulterated with foreign substances and from being discolored. When the apron and gutters are moved upwardly on the tree it is merely necessary to unwrap the wire from the nail 16, the wire being subsequently reapplied to this nail so as to be held taut between the spout and the cup.

Another embodiment of the invention is illustrated in Fig. 6, wherein the cup is omitted, and the apron, gutters, and wire are applied to a tree which is boxed in the well known manner, as indicated at 17, in order to collect the sap.

It will thus be apparent that the scope of usefulness of the invention is considerably increased.

Having thus described the invention, what I claim is:

1. A turpentine gatherer including coacting sections for attachment to a tree and having their inner ends provided with interengaging flanges, the lower ends of said sections being bent to form inclined gutters, the inner end of one of which is extended longitudinally beyond and disposed in a plane below the inner end of the mating gutter.

2. A turpentine gatherer including coacting plates for attachment to a tree and having their inner ends provided with interengaging flanges and their lower longitudinal edges bent outwardly and thence upwardly to produce gutters, the inner end of the gutter of one plate terminating short of the adjacent flange, and the inner end of the gutter of the mating plate extending longitudinally beyond the flange of said mating plate and disposed in a plane below the gutter of the first mentioned plate.

3. A turpentine gatherer including coacting plates for attachment to a tree and having their inner ends provided with interengaging flanges, and gutters of different lengths carried by said plates, the inner end of the long gutter being extended longitudinally beyond the inner end of the short gutter so as to catch the sap from said short gutter and disposed in a plane below the latter.

4. A turpentine gatherer including coacting plates for attachment to a tree and having their inner ends provided with vertically disposed interengaging flanges, the lower longitudinal edge of each plate being bent outwardly at an angle to the tree and thence upwardly to form a gutter, the inner end of the gutter of one of the plates terminating short of the adjacent flange and the inner end of the gutter of the mating plate being extended beyond the flange of said mating plate.

In testimony whereof I affix my signature in presence of two witnesses.

LEWIS T. BAKER. [L. S.]

Witnesses:
  A. H. BAKER,
  E. H. HYMAN.